US011757668B1

(12) United States Patent
Saitoh et al.

(10) Patent No.: US 11,757,668 B1
(45) Date of Patent: Sep. 12, 2023

(54) ENABLING PRIVATE COMMUNICATIONS DURING A WEB CONFERENCE

(71) Applicant: International Business Machines Corporation, Armonk, NY (US)

(72) Inventors: Masaki Saitoh, Yokohama (JP); Chikafumi Yasumoto, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/661,404

(22) Filed: Apr. 29, 2022

(51) Int. Cl.
*H04L 12/18* (2006.01)
*H04L 65/1083* (2022.01)

(52) U.S. Cl.
CPC ...... *H04L 12/1822* (2013.01); *H04L 65/1086* (2013.01)

(58) Field of Classification Search
None
See application file for complete search history.

(56) References Cited

U.S. PATENT DOCUMENTS

| | | | |
|---|---|---|---|
| 9,338,285 B2 | 5/2016 | Anderson | |
| 11,032,335 B1* | 6/2021 | Knas | H04M 3/564 |
| 11,321,643 B1* | 5/2022 | Poel | G06Q 10/06311 |
| 2005/0221851 A1* | 10/2005 | Grivas | H04W 84/08 |
| | | | 455/518 |
| 2006/0164507 A1 | 7/2006 | Eshkoli | |
| 2007/0300165 A1 | 12/2007 | Haveliwala | |
| 2012/0128146 A1* | 5/2012 | Boss | H04M 3/564 |
| | | | 379/202.01 |
| 2012/0287827 A1* | 11/2012 | Denne | H04L 12/1818 |
| | | | 370/261 |
| 2013/0027508 A1 | 1/2013 | Charish | |

(Continued)

FOREIGN PATENT DOCUMENTS

| | | |
|---|---|---|
| CN | 112804267 B | 7/2021 |
| JP | 2021035052 A | 3/2021 |

OTHER PUBLICATIONS

"Enabling breakout rooms". Zoom Support, Dec. 20, 2021, 4 pages, <https://support.zoom.us/hc/en-us/articles/206476093-Enabling-breakout-rooms>.

(Continued)

*Primary Examiner* — Joshua Joo
(74) *Attorney, Agent, or Firm* — Tyrus Cartwright; Jared L. Montanaro (57) ABSTRACT

Aspects for enabling private communications during a web conference are described. In an embodiment, one or more processors are configured for establishing a main channel for communication in a web conference comprising a plurality of users attending the web conference; transmitting main channel audio data to computing devices associated with the plurality of users; receiving a first sub-channel request comprising an invitation from a first user to at least a second user of the plurality of users; establishing a first sub-channel for communication in the web conference comprising the first user and at least the second user; generating first sub-channel audio data comprising reduced main channel audio data and first sub-channel input audio data comprising first user input audio data and second user input audio data; and transmitting the first sub-channel audio data to the first sub-channel.

17 Claims, 6 Drawing Sheets

(56) References Cited

U.S. PATENT DOCUMENTS

| | | | |
|---|---|---|---|
| 2013/0132058 A1* | 5/2013 | Butler | G06F 17/00 |
| | | | 703/21 |
| 2016/0316064 A1* | 10/2016 | Ohman | H04M 3/568 |
| 2017/0187884 A1* | 6/2017 | Minor | H04L 65/1059 |
| 2018/0013893 A1* | 1/2018 | Cohen | G06Q 10/0631 |
| 2018/0097858 A1* | 4/2018 | Gilzean | H04L 65/4015 |
| 2019/0165750 A1* | 5/2019 | Goldman-Shenhar | |
| | | | H03G 7/007 |
| 2019/0378502 A1* | 12/2019 | Bostick | G06F 40/30 |
| 2020/0174739 A1 | 6/2020 | Boss | |
| 2021/0224753 A1 | 7/2021 | Nasir | |
| 2021/0258427 A1* | 8/2021 | Lee | H04L 12/1831 |
| 2021/0359998 A1* | 11/2021 | Timmons | H04L 63/104 |
| 2022/0014712 A1* | 1/2022 | Cordourier Maruri | |
| | | | H04M 3/568 |
| 2022/0239779 A1* | 7/2022 | Balyasny | H04L 65/403 |
| 2022/0321832 A1* | 10/2022 | Lin | H04N 7/15 |
| 2023/0028265 A1* | 1/2023 | Powell | H04L 65/4015 |

OTHER PUBLICATIONS

Kreamer et al., "Break up your big virtual meetings", Harvard Business Review, Apr. 29, 2020, 6 pages, <https://hbr.org/2020/04/break-up-your-big-virtual-meetings>.

"Patent Cooperation Treaty PCT Notification of Transmittal of the International Search Report and the Written Opinion of the International Searching Authority, or the Declaration", Applicant's file reference PF221250PCT, International application No. PCT/CN2023/089454, International filing date Apr. 20, 2023, dated Jun. 7, 2023, 9 pages.

* cited by examiner

ENABLING PRIVATE COMMUNICATIONS DURING A WEB CONFERENCE

BACKGROUND

The present invention relates generally to the field of online web conference privacy, and more particularly to enabling private communications during an online web conference.

Online meeting systems have been widely used when remotely hosting lectures or webinars or web-based seminars. In such systems, participants are completely divided into different roles including a speaker and listeners. During an online web conference, where several users are actively engaged in a conferencing platform, one or more of the users may communicate with one or more of the other users within the videoconferencing platform. For example, a first user may be presenting to the other users and the other users may be listening in a listen only mode, where their microphones are not activated.

SUMMARY

Aspects of the present invention disclose computer-implemented methods, computer program products, and computer systems for enabling private communications during a web conference. One embodiment of the invention may include a computer-implemented method for enabling private communications during a web conference.

In an embodiment, the computer-implemented method may include one or more processors configured for establishing a main channel for communication in a web conference comprising a plurality of users attending the web conference. Further, the one or more processors may be configured for transmitting main channel audio data to computing devices associated with the plurality of users. Furthermore, the one or more processors may be configured for receiving a first sub-channel request comprising an invitation from a first user to at least a second user of the plurality of users. Even further, the one or more processors may be configured for establishing a first sub-channel for communication in the web conference comprising the first user and at least the second user. Furthermore, the one or more processors may be configured for generating first sub-channel audio data comprising reduced main channel audio data and first sub-channel input audio data comprising first user input audio data and second user input audio data and transmitting the first sub-channel audio data to the first sub-channel.

DETAILED DESCRIPTION

Embodiments of the present invention may include one or more processors configured for enabling private communications during a web conference.

While conventional online conference platforms allow multiple users to speak at the same time while a presenter is speaking, one or more users speaking while the presenter is speaking is disruptive to the speaker and the other listeners if not within the context of the presentation. The users listening in a listen only mode may not be allowed to communicate with other users or may be able to speak to all the other users within the conferencing platform. Further, some of the users may want to speak privately with other users while also still listening to the presenter, but it will be difficult to ascertain the subject matter of the presenter since the audio levels would be the same to each listener.

Embodiments of the present invention recognize that a sub-set of attendee users in a web conference may want to partake in a private conversation while still listening to the presenter of the web conference. Therefore, embodiments described herein are configured to receive and process requests to create a sub-channel, admit the invited users to the sub-channel, gather input audio data from each of the admitted users in the sub-channel, and transmit the gathered input audio data to the sub-channel along with reduced main channel audio data to allow the sub-channel users to hear other sub-channel user audio data at a normal volume level along with lower volume main channel audio data as background audio in the sub-channel. Further, embodiments herein may be configured to adjust the audio volume levels of various audio input signals to sub-channels to allow users of the sub-channels to maintain access to the main channel audio data, but at reduced or increased audio levels.

In an embodiment, the one or more processors may be configured to transmit the gathered input audio data to the sub-channel along with a reduced volume of the main channel audio data to allow the sub-channel users to hear other sub-channel user audio data at a normal volume level along with lower volume main channel audio data as background audio in the sub-channel.

In an embodiment, multiple users may transmit data corresponding to a registration to register the multiple users to an online meeting server, wherein the online meeting server is configured to host an online seminar to permit at least one of the multiple users to serve as a presenter and distribute presenter audio data (e.g., first input audio data, input 1) to a main channel (e.g., first output audio data, output 1, output 2) accessible by each of the multiple users. The other users who are not presenting may be configured to receive audio data corresponding to the main channel (e.g., first output audio data, output 1, output 2) in a listen only mode corresponding to only receiving main channel audio data and not transmitting respective input audio data.

In an embodiment, users other than the presenter may be configured to transmit a sub-channel request to establish a sub-channel, wherein the sub-channel request may include an invitation to other users to participate in the sub-channel. In an embodiment, only users other than the presenter may be invited to the sub-channel. Further, input audio data of the sub-channel users may be combined with a reduced volume of the main channel audio data as background audio for distribution within the sub-channel. For example, if a sub-channel is established responsive to an invitation from a first user to a second user, then the sub-channel may be configured to receive first user input audio data from the first user, second user input audio data from the second user, and apply a reduced audio factor (e.g., 0.2, 0.4) to the main channel audio data to generate reduced main channel audio data (e.g., 0.2×input 1).

Even further, in an embodiment, the sub-channel audio data may be distributed to the first user and the second user, wherein the first user may receive third output audio data (e.g., output 3) comprising the second user input audio data and the reduced main channel audio data and the second user may be configured to receive fourth output audio data (e.g., output 4) comprising the first user input audio data and the reduced main channel audio data.

Embodiments of the present invention also recognize that multiple users may submit a sub-channel request by inviting other users in the online meeting platform, wherein the sub-channel request may include a sub-channel mode corresponding to a public mode or a private mode.

In an embodiment, in the sub channel, input audio of users participating in the public sub-channel may be combined with input audio to any other sub channel set to a public mode with reduced volume as a background and then distributed to the public mode sub-channel. For example, public mode sub-channel audio data may include output audio data to a second user including input audio data from the first user and reduced main channel audio data. Further, for example, public mode sub-channel audio data may include output audio data to a third user including input audio data from the second user and reduced main channel audio data. In an embodiment, a reduced audio factor (e.g., 0.2, 0.4) may be applied to the main channel audio data to generate reduced main channel audio data.

In an embodiment, other users may be allowed to newly participate in a sub-channel having already been established and set to a public mode. In another embodiment, audio of a sub-channel set to a private mode may not be distributed to other sub-channels and users are allowed to newly participate in a private mode sub-channel only through invitation from an existing participant in the private mode sub-channel. For example, in the sub-channel, audio of users participating in the private mode sub channel may not be combined with audio of the other sub channels.

In yet another embodiment, participant users in the online web conference may be permitted to simultaneously participate in multiple sub-channels or may only be restricted to participate in one sub-channel at a time. Further, a ratio of voice volume of each channel combined may be variable, such that the reduce audio factor applied to the main channel audio data and/or the sub-channel audio data may vary based on the specifications provided as user input or online web conference settings. For example, ratios of public sub-channels combined as background audio data may be changed respectively to allow reproduction of long/short distances to speakers in the online or web conference platform. Alternatively, a user may be configured to provide user input corresponding to a server notification request to increase a composition ratio of an interesting channel responsive to the user determining an interesting topic is being discussed on the interesting channel, wherein the server may be configured to increase the volume of the interesting channel in distributed composite audio.

Embodiments of the present invention recognize that users may desire features described herein for online meetings, online seminars, online lectures, online banquets, and the like. Further, embodiments described herein may be configured to allow users to communicate in a whisper (e.g., lower audio volume relative to a main channel audio volume), wherein the audio of a presenter is not cut off so that users do not miss contents of a lecture. Furthermore, embodiments described herein may be configured to prevent audio data corresponding to users talking in a whisper from being mixed with audio of a presenter in the lecture, thus causing noise to other audience members or attendees to the online web conference.

The present invention will now be described in detail with reference to the Figures.

Figure 1:
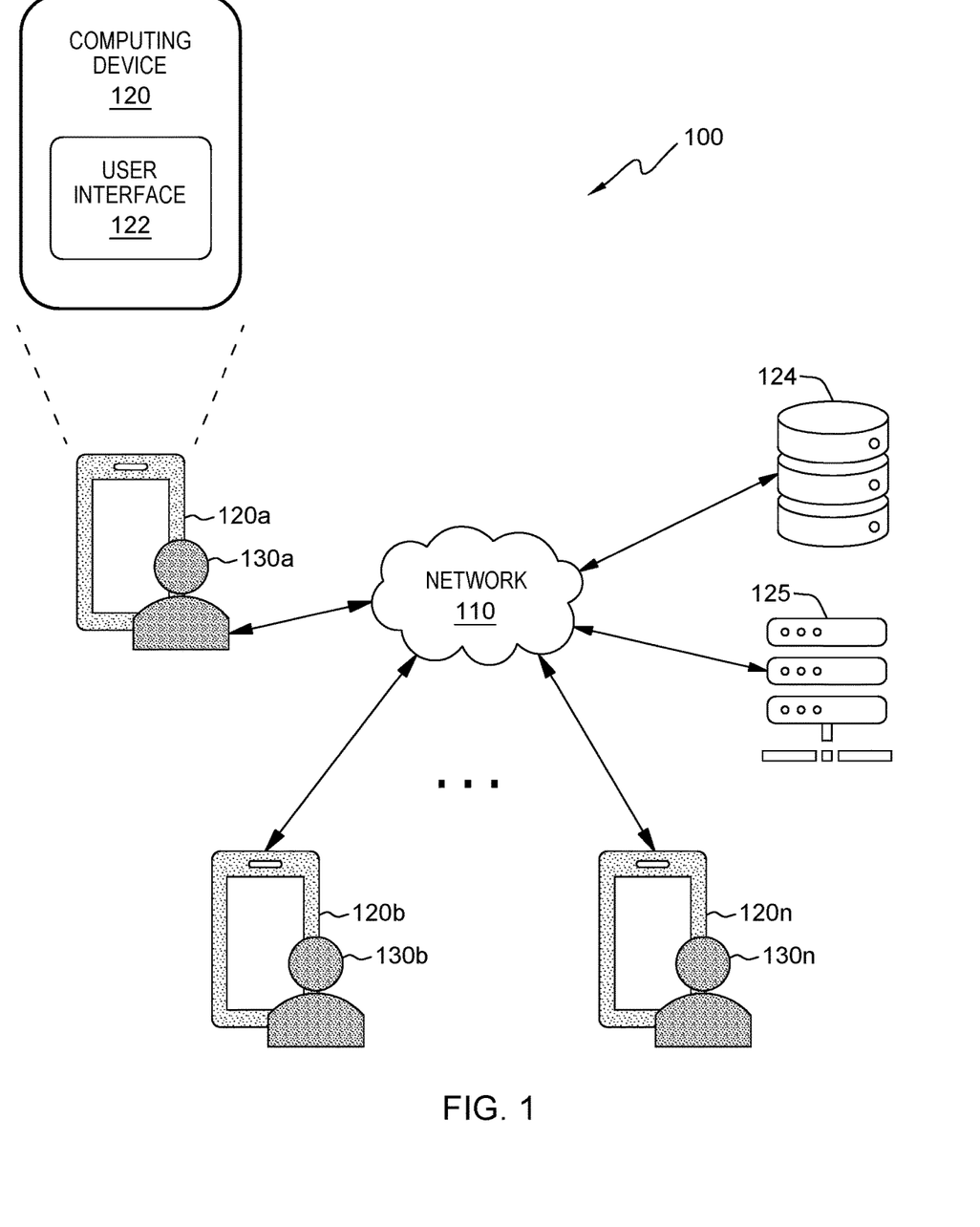
FIG. 1 depicts a block diagram of a distributed data processing environment for enabling private communications during a web conference, in accordance with an embodiment of the present invention.

FIG. 1 depicts a block diagram of a distributed data processing environment 100 for enabling private communications during a web conference, in accordance with an embodiment of the present invention. FIG. 1 provides only an illustration of one embodiment of the present invention and does not imply any limitations with regard to the environments in which different embodiments may be implemented.

In the depicted embodiment, distributed data processing environment 100 includes computing device 120*a* associated with a first user 130*a*, additional computing devices 120*b* . . . 120*n* associated with respective users 130*b* . . . 130*n*, server 125, and database 124, interconnected over network 110. Network 110 operates as a computing network that can be, for example, a local area network (LAN), a wide area network (WAN), or a combination of the two, and can include wired, wireless, or fiber optic connections. In general, network 110 can be any combination of connections and protocols that will support communications between computing device 120*a*, additional computing devices 120*b* . . . 120*n*, server 125, and database 124. Distributed data processing environment 100 may also include additional servers, computers, or other devices not shown.

Computing device 120*a* and additional computing devices 120*b* . . . 120*n* operate to execute at least a part of a computer program for enabling private communications during a web conference. In an embodiment, computing device 120*a* and additional computing devices 120*b* . . . 120*n* may be configured to send and/or receive data from one or more of the other computing device(s) via network 110. Computing device 120*a* and additional computing devices 120*b* . . . 120*n* may each include a user interface 122 configured to facilitate interaction between user 130 and computing device 120. For example, user interface 122 may include a display as a mechanism to display data to a user and may be, for example, a touch screen, light emitting diode (LED) screen, or a liquid crystal display (LCD) screen. User interface 122 may also include a keypad or text entry device configured to receive alphanumeric entries from a user. User interface 122 may also include other peripheral components to further facilitate user interaction or data entry by user associated with respective computing device 120.

In some embodiments, computing device 120*a* and additional computing devices 120*b* . . . 120*n* may be a management server, a web server, or any other electronic device or computing system capable of receiving and sending data. In some embodiments, computing device 120*a* and additional computing devices 120*b* . . . 120*n* may be a laptop computer, tablet computer, netbook computer, personal computer (PC), a desktop computer, a smart phone, or any programmable electronic device capable of communicating with database 124, server 125 via network 110. Computing device 120a and additional computing devices 120b . . . 120n may include components as described in further detail in FIG. 6.

Computing device 120a and additional computing devices 120b . . . 120n may be configured to receive, store, and/or process data corresponding to embodiments of the invention described herein. Computing device 120a and additional computing devices 120b . . . 120n may be configured to store the data in memory or transmit the data to database 124 and/or server 125 via network 110 for further storage and/or processing.

Database 124 operates as a repository for data flowing to and from network 110. Examples of data include profile data corresponding to data sources associated with user profiles and their respective accounts created on a web conference platform. A database is an organized collection of data. Database 124 can be implemented with any type of storage device capable of storing data and configuration files that can be accessed and utilized by computing device 120a and additional computing devices 120b . . . 120n, such as a database server, a hard disk drive, or a flash memory. In an embodiment, database 124 is accessed by computing device 120a and additional computing devices 120b . . . 120n to store data corresponding to creating a user account on a web conference platform, uploading media to the web conference platform server, and interactions performed within the web conference platform. In another embodiment, database 124 may reside elsewhere within distributed network environment 100 provided database 124 has access to network 110.

Server 125 can be a standalone computing device, a management server, a web server, or any other electronic device or computing system capable of receiving, sending, and processing data and capable of communicating with computing device 120a and additional computing devices 120b . . . 120n, and/or database 124 via network 110. In other embodiments, server 125 represents a server computing system utilizing multiple computers as a server system, such as a cloud computing environment. In yet other embodiments, server 125 represents a computing system utilizing clustered computers and components (e.g., database server computers, application server computers, etc.) that act as a single pool of seamless resources when accessed within distributed data processing environment 100. Server 125 may include components as described in further detail in FIG. 6.

Figure 2:
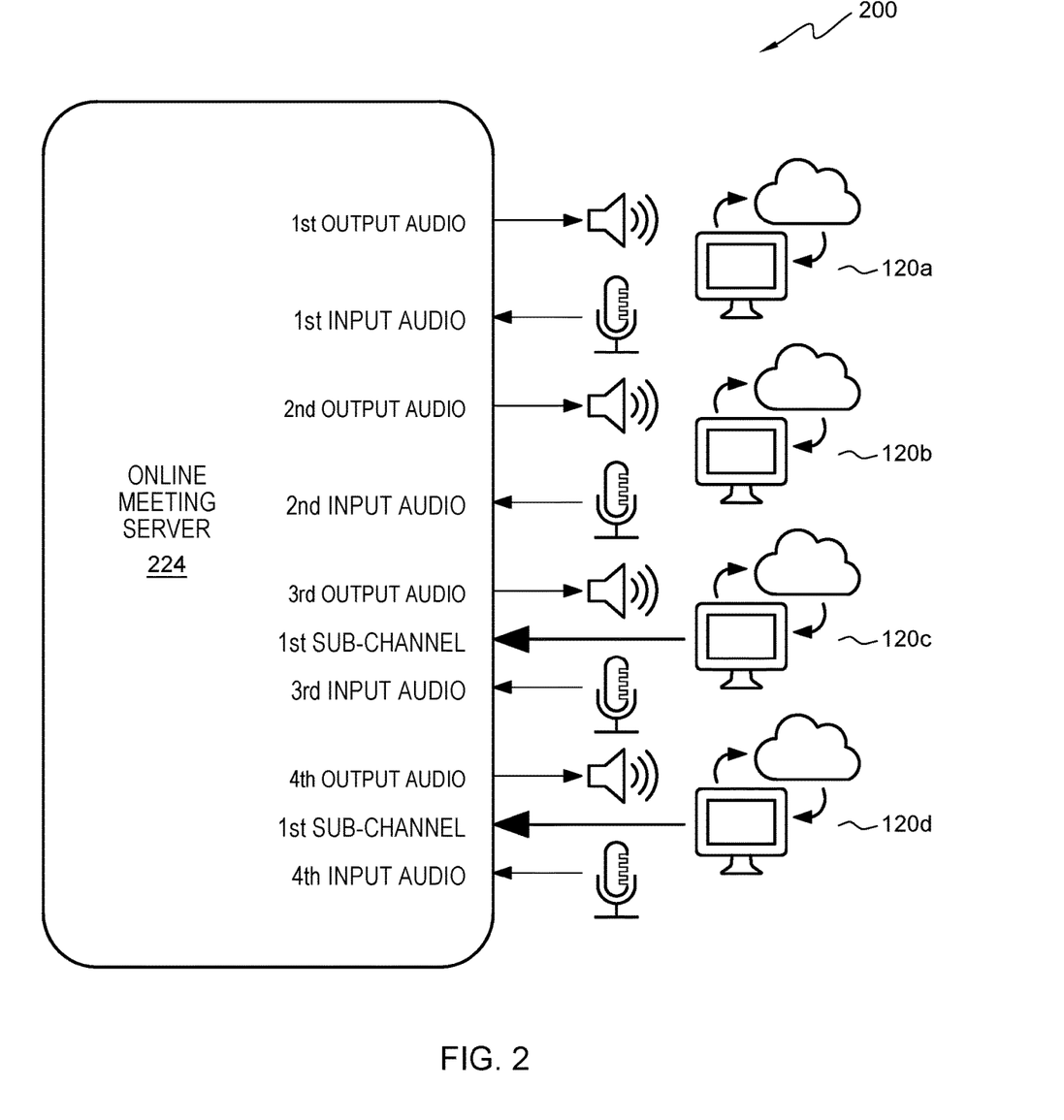
FIG. 2 depicts a server diagram of a system for enabling private communications during a web conference, in accordance with an embodiment of the present invention.

FIG. 2 depicts a server diagram of a system 200 for enabling private communications during a web conference, in accordance with an embodiment of the present invention.

In an embodiment, system 200 may include online meeting server 224 configured to facilitate communications between computing devices(s) 120 engaged in a web conference. For example, system 200 may include one or more processors configured for establishing a main channel for communication in a web conference comprising a plurality of users attending the web conference. In an embodiment, each of the plurality of users may be associated with a respective computing device(s) 120. For example, the one or more processors may be configured for transmitting main channel audio data to computing device(s) 120 associated with the plurality of users, wherein main channel audio data may include first output audio to a first computing device 120a, second output audio to a second computing device 120b, third output audio to a third computing device 120c, fourth output audio to a fourth computing device 120d, and so on.

In an embodiment, the one or more processors may also be configured to receive input audio data from the computing devices 120. For example, input audio data may include first input audio from a first microphone of the first computing device 120a, second input audio from a second microphone of the second computing device 120b, third input audio from a third microphone of the third computing device 120c, fourth input audio from a fourth microphone of the fourth computing device 120d, and so on.

In an embodiment, online meeting server 224 may include one or more processors configured to receive a first sub-channel request comprising an invitation from a first user (e.g., third user associated with third computing device 120c) to at least a second user (e.g., fourth user associated with fourth computing device 120d) of the plurality of users. For example, third computing device 120c may be configured to receive user input corresponding to a request from a first user (e.g., third user associated with third computing device 120c) to establish a first sub-channel, wherein the request may include an invitation to a second user (e.g., fourth user associated with fourth computing device 120d) to join the sub-channel requested by the first user. Further, the one or more processors may be configured to transmit the invitation to the second user and configured to receive user input from the second user corresponding to an acceptance or a rejection to the invitation. Responsive to receiving the acceptance from the second user, the one or more processors may be configured to establish the first sub-channel for communication in the web conference comprising the first user and the second user. In an embodiment, responsive to receiving the rejection from the second user, the one or more processors may be configured to either establish the sub-channel with only the first user or fail to establish the sub-channel.

In an embodiment, the one or more processors may be configured to generate first sub-channel data comprising input audio data from the microphones of the computing devices in the first sub-channel and reduced main channel audio data. For example, for each user that accepted the invitation to join the first sub-channel, the input audio data for each accepting user may be processed and generated as part of the input audio data to the first sub-channel and generated as output audio data to each of the accepting users in addition to the reduced main channel audio data as background audio in the first sub-channel.

Figure 3:
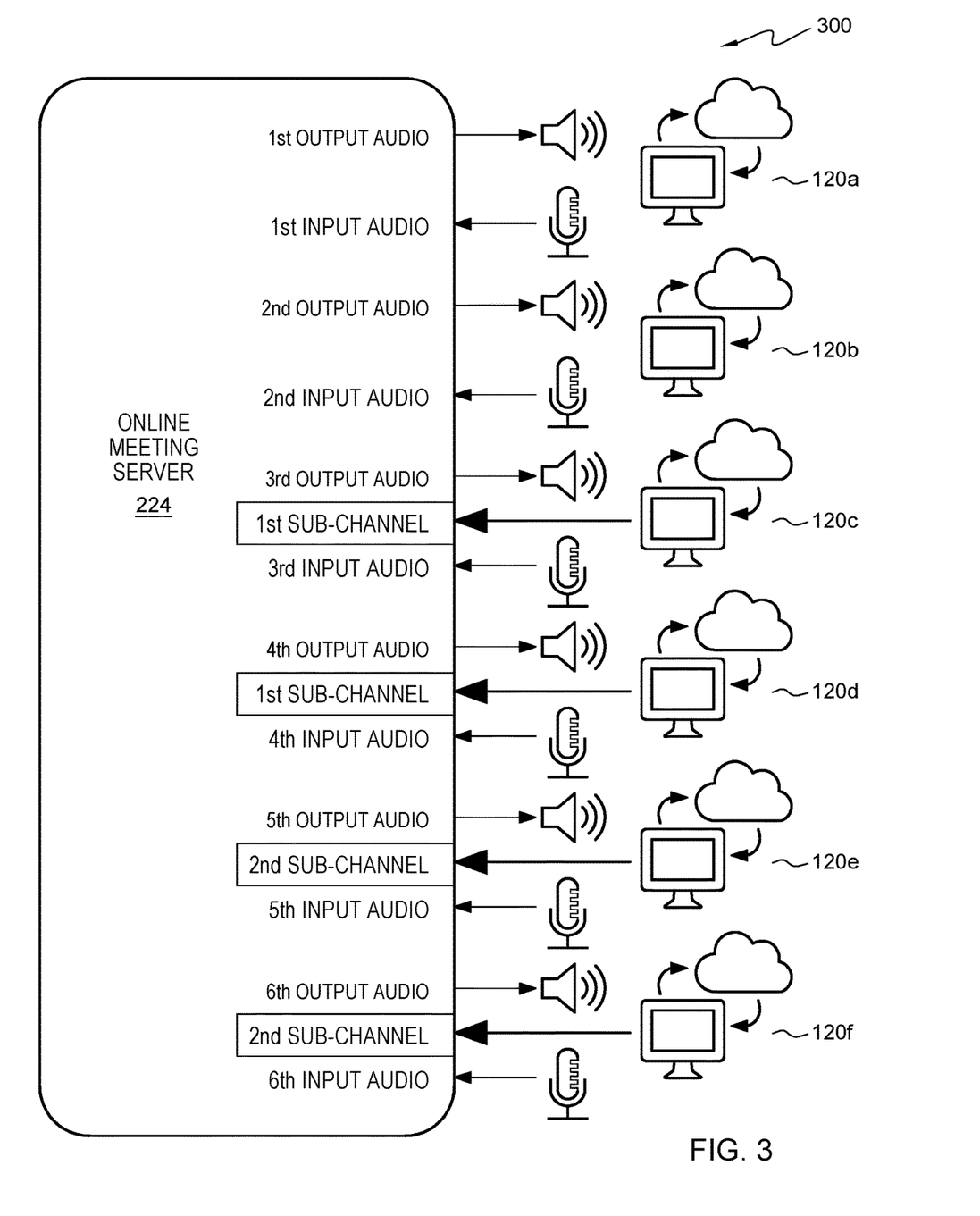
FIG. 3 depicts a server diagram of a system for enabling private communications during a web conference, in accordance with an embodiment of the present invention.

FIG. 3 depicts a server diagram of a system 300 for enabling private communications during a web conference, in accordance with an embodiment of the present invention.

In an embodiment, system 300 may include all the components and features of system 200 with the addition of a fifth computing device 120e and a sixth computing device 120f configured to receive user input data corresponding to a request to establish a second sub-channel between the fifth computing device 120e and the sixth computing device 120f.

In an embodiment, the one or more processors may be configured to receive user input data corresponding to a request to establish a sub-channel, wherein the request may include a sub-channel mode corresponding to either a public mode or a private mode, as described above herein. Thus, if the first sub-channel is set to the public mode and the second sub-channel is set to the public mode, then the first sub-channel may include first sub-channel audio data comprising audio data of all the users in the first sub-channel, reduced main channel audio data, and reduced second sub-channel audio data corresponding to the second sub-channel audio data reduced by a reduced audio factor. Similarly, if the second sub-channel is set to the public mode and the first sub-channel is set to the public mode, then the second sub-channel may include second sub-channel audio data comprising audio data of all the users in the second sub-channel, reduced main channel audio data, and reduced first sub-channel audio data corresponding to the first sub-channel audio data reduced by a reduced audio factor.

In an embodiment, if the first sub-channel is set to the private mode, then the first sub-channel may include first sub-channel audio data comprising audio data of all the users in the first sub-channel, reduced main channel audio data, and no other input audio data from other sub-channels. Further, the input audio data received in a private mode sub-channel may not be transmitted to any other sub-channel that, or user who is not admitted to the private sub-channel. Even further, no user may be admitted to the private mode sub-channel unless my receiving an invitation to the private mode sub-channel by another user who is in the private mode sub-channel.

In an embodiment, system 300 may include one or more processors configured to adjust output audio data transmissions to user computing devices responsive to establishing a main channel for audio transmissions. For example, in a web conference comprising six user participants, wherein each user receives output audio data (e.g., first output audio data to a first user, second output audio data to a second user, and so on), the one or more processors may be configured to generate output audio data to each of the six user participants based on their participation in the main channel. For instance, if only a main channel is established in the web conference, a first computing device associated with a first user may receive first output audio data, a second computing device associated with a second user may receive second output audio data, a third computing device associated with a third user may receive third output audio data, a fourth computing device associated with a fourth user may receive fourth output audio data, a fifth computing device associated with a fifth user may receive fifth output audio data, and a sixth computing device associated with a sixth user may receive sixth output audio data. Additional users may be configured to participate in the web conference and may receive corresponding output audio data via their respective computing devices.

In an embodiment, the output audio data to each user participating in the web conference may include the output audio data from every other user participating in the web conference. For example, the first computing device associated with the first user may be configured to receive output audio data from the second user, the third user, the fourth user, the fifth user, and the sixth user. Further, the second computing device associated with the second user may be configured to receive output audio data from the first user, the third user, the fourth user, the fifth user, and the sixth user. For each remaining user participant in the web conference, the corresponding computing device may be configured to receive the output audio data from the other user participants.

In an embodiment, system 300 may include one or more processors configured to adjust output audio data transmissions to user computing devices responsive to establishing sub-channels. For example, in a web conference comprising six user participants, wherein each user receives output audio data from online meeting server 224, the one or more processors may be configured to generate output audio data to each of the six user participants based on their participation in one or more of the main channel and the sub-channel(s). In an embodiment, responsive to receiving a first sub-channel request from a user participant (e.g., the third user associated with third computing device 120*c*) to establish a first sub-channel with another user participant (e.g., the fourth user associated with fourth computing device 120*d*), and the first sub-channel is determined to be a public mode sub-channel, the one or more processors may be configured to establish the first sub-channel between third computing device 120*c* and fourth computing device 120*d*. Furthermore, during the time in which the first sub-channel is established, the one or more processors may be configured to generate main channel output audio data comprising reduced first sub-channel input audio data (e.g., reduced third input audio data and reduced fourth input audio data) and remaining user input audio data (e.g., first input audio data, second input audio data, fifth input audio data, and sixth input audio data).

In an embodiment, system 300 may include one or more processors configured to generate public sub-channel output audio data comprising reduced main channel output audio data (e.g., reduced first input audio data, reduced second input audio data, reduced fifth input audio data, reduced sixth input audio data) corresponding to reduced audio input data from the user participants not invited to the first sub-channel that is in a public mode, wherein the user participants in the first sub-channel receive normal input audio data of their sub-channel counterparts (e.g., sub-channel user participants) and reduced input audio data of the non-sub-channel user participants.

In an embodiment, responsive to receiving a second sub-channel request from a user participant (e.g., the fifth user associated with fifth computing device 120*e*) to establish a second sub-channel with another user participant (e.g., the sixth user associated with sixth computing device 120*f*), and the second sub-channel is determined to be a private mode sub-channel, the one or more processors may be configured to establish the second sub-channel between fifth computing device 120*e* and sixth computing device 120*f*. Furthermore, during the time in which the second sub-channel is established, the one or more processors may be configured to generate main channel output audio data comprising reduced main channel output audio data (e.g., reduced first input audio data, reduced second input audio data) corresponding to reduced audio input data from the main channel. Further, during the time in which the second sub-channel is established, the one or more processors may be configured to generate reduced sub-channel audio data comprising reduced first sub-channel input audio data (e.g., reduced third input audio data and reduced fourth input audio data) since the first sub-channel is set to the public mode. In other words, all sub-channels may be configured to receive input audio data from other sub-channels set to the public mode. Even further, during the time in which the second sub-channel is established, the one or more processors may be configured to generate second sub-channel output audio data comprising fifth input audio data and sixth input audio data corresponding to the user input data of all the user participants who have joined the second sub-channel in the private mode. However, none of the computing devices associated with user participants who are not in the second sub-channel in the private mode may be configured to receive the second sub-channel output audio data.

Figure 4:
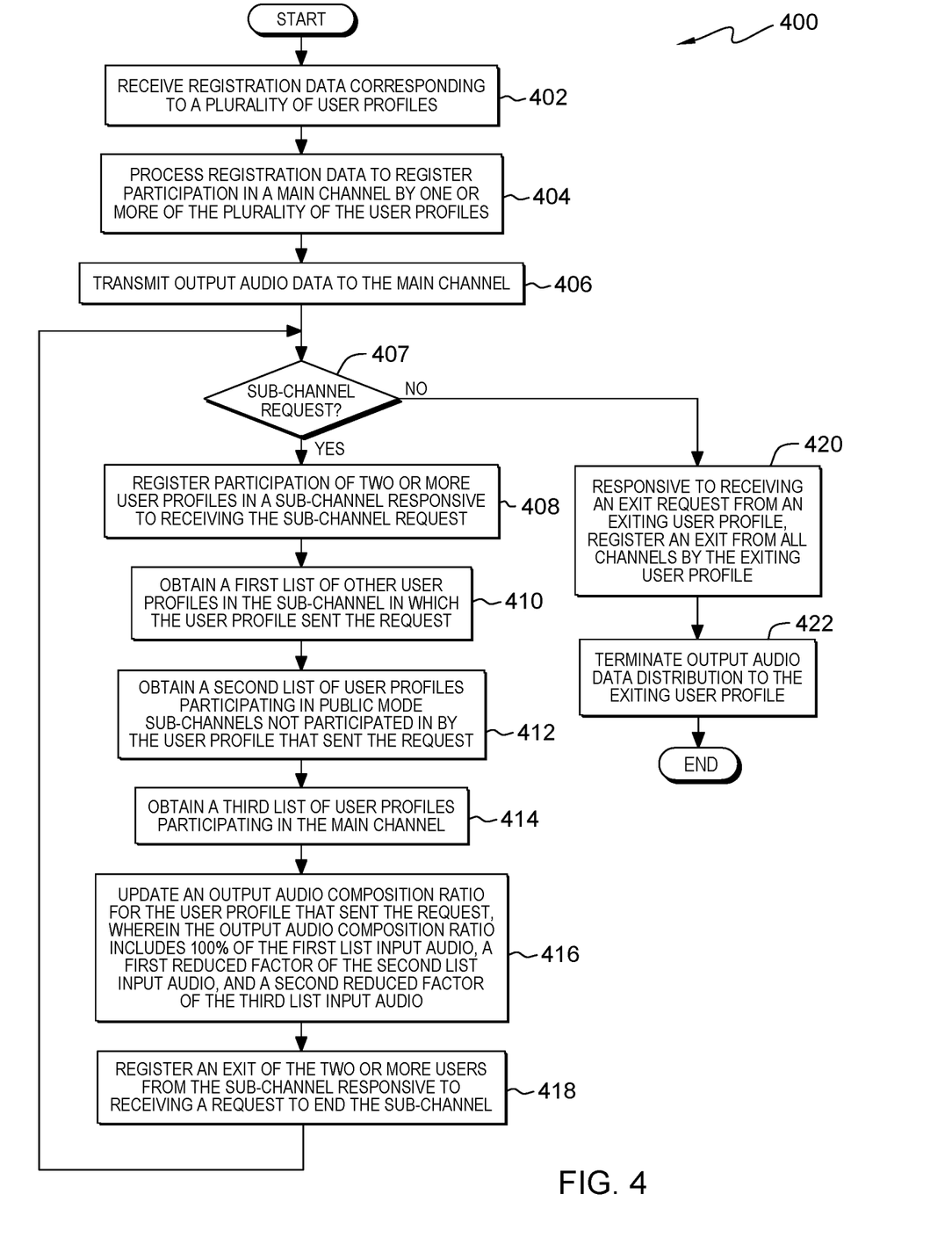
FIG. 4 depicts a flow chart of steps of a computer-implemented method for enabling private communications during a web conference, in accordance with an embodiment of the present invention.

FIG. 4 depicts a flow chart of steps of a computer-implemented method 400 for enabling private communications during a web conference, in accordance with an embodiment of the present invention.

In an embodiment, computer-implemented method 400 may include one or more processors configured to receive 402 registration data corresponding to a plurality of user profiles. Further, computer-implemented method 400 may include one or more processors configured to process 404 registration data to register participation in a main channel by one or more of the pluralities of the user profiles.

In an embodiment, computer-implemented method 400 may include one or more processors may be configured to transmit 406 output audio data to the main channel.

In an embodiment, computer-implemented method 400 may include one or more processors configured to determine 407 if a sub-channel request was issued by one or more of the plurality of user profiles. Further, if a sub-channel request was received, then the one or more processors may be configured to register 408 participation of two or more user profiles in a sub-channel responsive to receiving the sub-channel request.

In an embodiment, computer-implemented method 400 may include one or more processors configured to obtain 410 a first list of other user profiles in the sub-channel in which the user profile sent the request.

In an embodiment, computer-implemented method 400 may include one or more processors configured to obtain 412 a second list of user profiles participating in public mode sub-channels not participated in by the user profile that sent the request.

In an embodiment, computer-implemented method 400 may include one or more processors configured to obtain 414 a third list of user profiles participating in the main channel.

In an embodiment, computer-implemented method 400 may include one or more processors configured to update 416 an output audio composition ratio for the user profile that sent the request, wherein the output audio composition ratio includes 100% of the first list input audio, a first reduced factor of the second list input audio, and a second reduced factor of the third list input audio.

In an embodiment, computer-implemented method 400 may include one or more processors configured to register 418 an exit of the two or more users from the sub-channel responsive to receiving a request to end the sub-channel.

In an embodiment, computer-implemented method 400 may include one or more processors configured for continuously determining (see determine 407 step above), during the duration of the web conference, if a sub-channel request is received and perform the above-described steps accordingly.

In an embodiment, responsive to determining that a sub-channel request is not received, and responsive to receiving an exit request from an exiting user profile, computer-implemented method 400 may include one or more processors configured to register 420 an exit from all channels by the exiting user profile.

In an embodiment, computer-implemented method 400 may include one or more processors configured to terminate 422 output audio data distribution to the exiting user profile.

In an embodiment, online meeting server 224 may include one or more processors configured to receive a request to join a web conference from a user profile, process the request from the user profile to join the web conference to register the user profile participation in the web conference. Further, the one or more processors may be configured to start transmitting output audio data to the user profile as a new participant in the web conference.

In an embodiment, online meeting server 224 may include one or more processors configured to register a first user profile, a second user profile and a third user profile participation in the web conference, wherein the one or more processors may be configured to receive a request to establish a public sub-channel including the second user profile and the third user profile. Once the public sub-channel including the second user profile and the third user profile is established, the one or more processors may be configured to update output audio for the first user profile in addition to the second user profile and the third user profile. For example, responsive to establishing the public sub-channel including the second user profile and the third user profile, the one or more processors may be configured to update the public sub-channel output audio to transmit reduced main channel audio to the second user profile and the third user profile. Further, the public sub-channel output audio may be updated to include output audio from the second user profile to the third user profile and output audio from the third user profile to the second user profile, wherein both the second user profile and the third user profile may receive normal output audio data from the other public sub-channel participants and reduced main channel audio data from the sub-channel participants. Additionally, output audio may be updated for the first user profile to include 100% main channel output audio and reduced public sub-channel output audio, wherein the first user profile may listen to a reduced volume version of the output audio in the public sub-channel.

Figure 5:
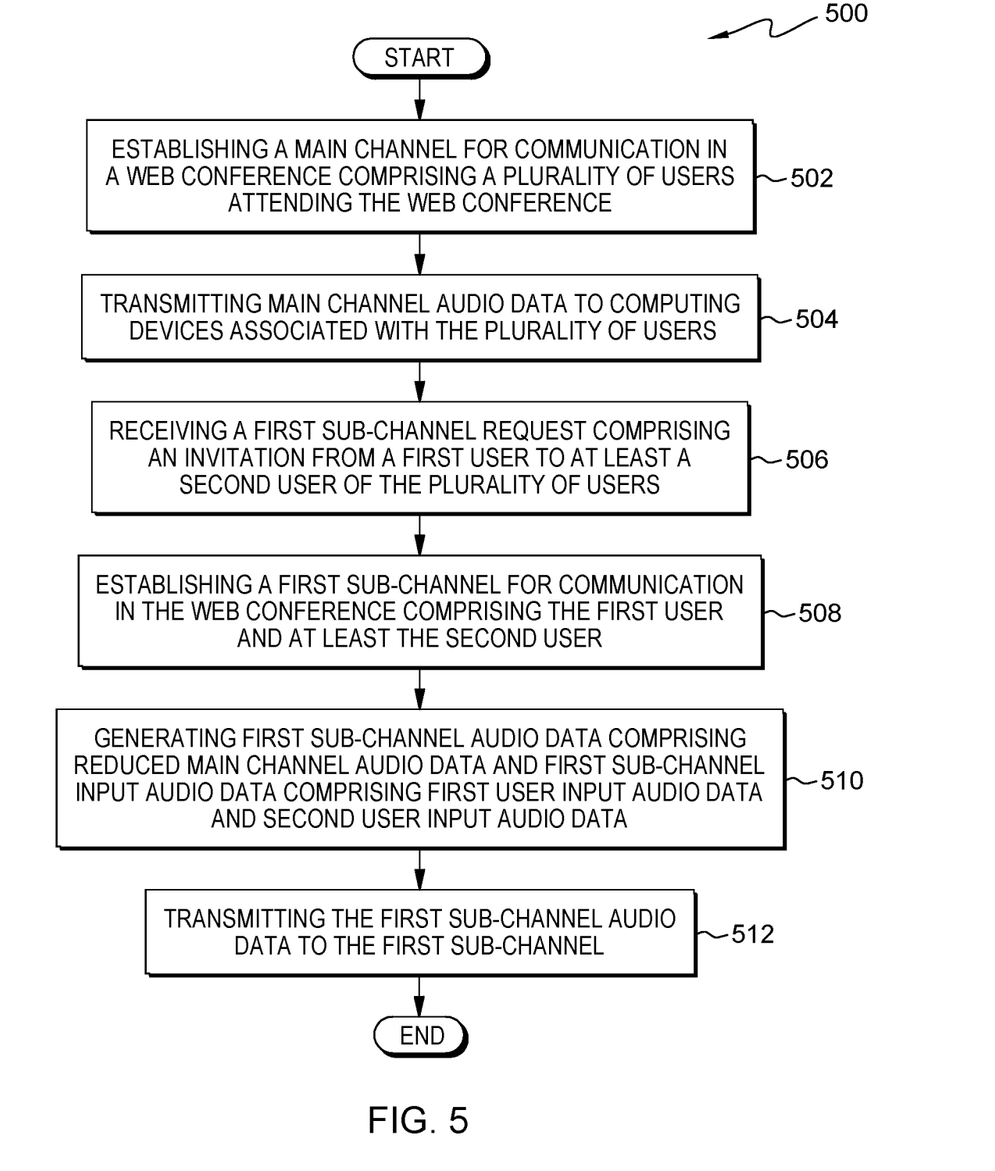
FIG. 5 depicts a flow chart of a computer-implemented method for enabling private communications during a web conference, in accordance with an embodiment of the present invention.

FIG. 5 depicts a flow chart of a computer-implemented method 500 for enabling private communications during a web conference, in accordance with an embodiment of the present invention.

In an embodiment, computer-implemented method 500 may include one or more processors configured for establishing 502 a main channel for communication in a web conference comprising a plurality of users attending the web conference.

In an embodiment, computer-implemented method 500 may include one or more processors configured for transmitting 504 main channel audio data to computing devices associated with the plurality of users.

In an embodiment, computer-implemented method 500 may include one or more processors configured for receiving 506 a first sub-channel request comprising an invitation from a first user to at least a second user of the plurality of users.

In an embodiment, computer-implemented method 500 may include one or more processors configured for establishing 508 a first sub-channel for communication in the web conference comprising the first user and at least the second user.

In an embodiment, computer-implemented method 500 may include one or more processors configured for generating 510 first sub-channel audio data comprising reduced main channel audio data and first sub-channel input audio data comprising first user input audio data and second user input audio data.

In an embodiment, computer-implemented method 500 may include one or more processors configured for transmitting 512 the first sub-channel audio data to the first sub-channel.

In an embodiment, the invitation from the first user to at least the second user may be configured to invite one or more of the plurality of users except a currently presenting user corresponding to a host of the web conference.

In an embodiment, the one or more processors configured for generating 510 the first sub-channel audio data may further include one or more processors configured for applying a first reduced audio factor to the main channel audio data to generate the reduced main channel audio data having a sub-channel decibel level that is less that a main channel decibel level.

In an embodiment, the one or more processors configured for transmitting 512 the first sub-channel audio data to the first sub-channel may further include one or more processors configured for transmitting the reduced main channel audio data and the first user input audio data to at least a second computing device associated with the second user, and transmitting the reduced main channel audio data and the second user input audio data to at least a first computing device associated with the first user.

In an embodiment, computer-implemented method 500 may include one or more processors configured for determining that the first sub-channel includes a sub-channel mode that is set to a public mode. Further, the one or more processors may be configured for identifying additional sub-channels comprising additional sub-channel audio data having respective sub-channel modes set to the public mode. Furthermore, the one or more processors may be configured for applying a second reduced audio factor to the additional sub-channel audio data to generate reduced sub-channel public audio data and transmitting the reduced sub-channel public audio data to the additional sub-channels.

In an embodiment, computer-implemented method 500 may include one or more processors configured for determining that the first sub-channel includes a sub-channel mode that is set to a private mode. Further, the one or more processors may be configured for restricting access to the first sub-channel set to the private mode to only the plurality of users receiving a second invitation from one or more of the first user and at least the second user communicating in the first sub-channel set to the private mode.

In an embodiment, computer-implemented method 500 may include one or more processors configured for receiving an audio factor change request corresponding to a decibel level change (e.g., increase or decrease) to one or more of the main channel audio data and the first sub-channel audio data.

Figure 6:
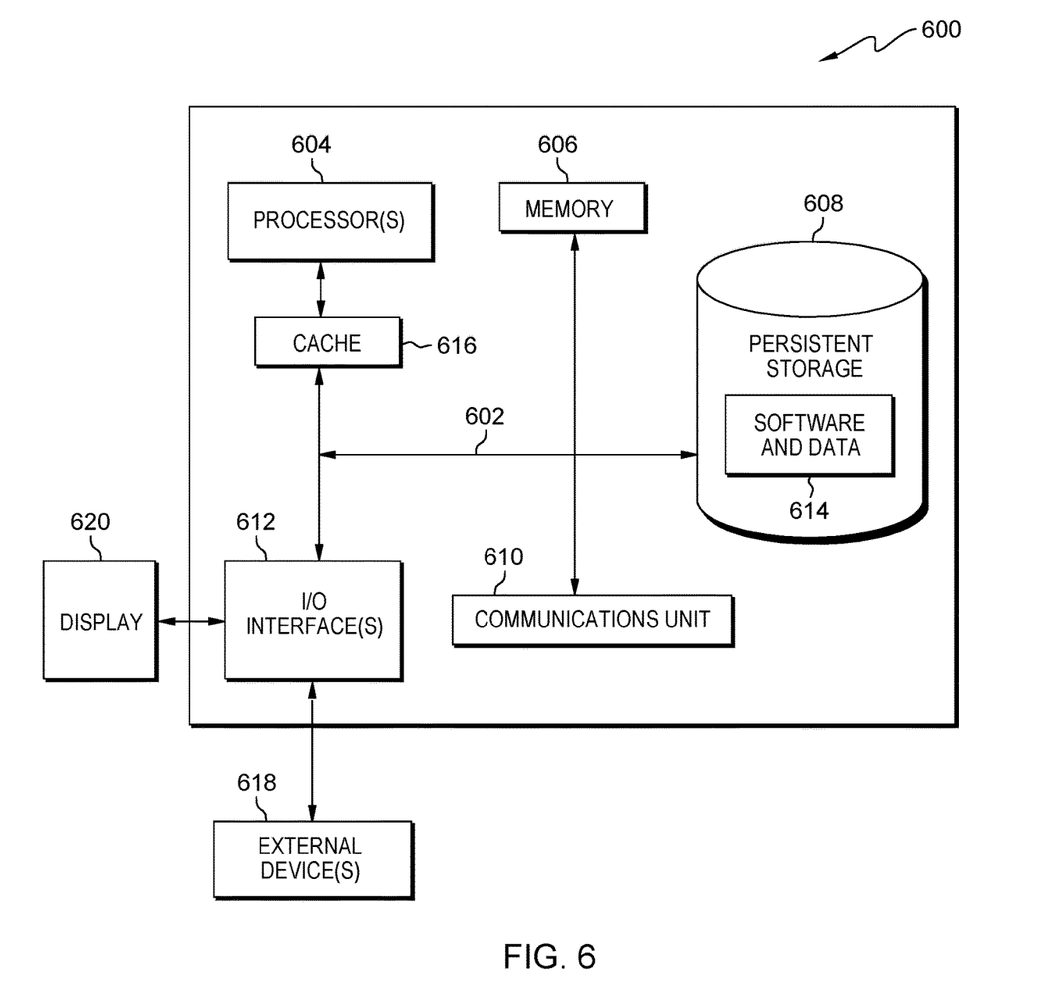
FIG. 6 depicts a block diagram of components of the server computer executing the computer-implemented method for enabling private communications during a web conference within the distributed data processing environment of FIG. 1, in accordance with an embodiment of the present invention.

FIG. 6 depicts a block diagram of components of the server computer executing the computer-implemented method for enabling private communications during a web conference within the distributed data processing environment of FIG. 1, in accordance with an embodiment of the present invention.

Computer 600 includes communications fabric 602, which provides communications between cache 616, memory 606, persistent storage 608, communications unit 610, and input/output (I/O) interface(s) 612. Communications fabric 602 can be implemented with any architecture designed for passing data and/or control information between processors (such as microprocessors, communications and network processors, etc.), system memory, peripheral devices, and any other hardware components within a system. For example, communications fabric 602 can be implemented with one or more buses or a crossbar switch.

Memory 606 and persistent storage 608 are computer readable storage media. In this embodiment, memory 606 includes random access memory (RAM). In general, memory 606 can include any suitable volatile or non-volatile computer readable storage media. Cache 616 is a fast memory that enhances the performance of computer processor(s) 604 by holding recently accessed data, and data near accessed data, from memory 606.

Programs may be stored in persistent storage 608 and in memory 606 for execution and/or access by one or more of the respective computer processors 604 via cache 616. In an embodiment, persistent storage 608 includes a magnetic hard disk drive. Alternatively, or in addition to a magnetic hard disk drive, persistent storage 608 can include a solid-state hard drive, a semiconductor storage device, read-only memory (ROM), erasable programmable read-only memory (EPROM), flash memory, or any other computer readable storage media that is capable of storing program instructions or digital information.

The media used by persistent storage 608 may also be removable. For example, a removable hard drive may be used for persistent storage 608. Other examples include optical and magnetic disks, thumb drives, and smart cards that are inserted into a drive for transfer onto another computer readable storage medium that is also part of persistent storage 608.

Communications unit 610, in these examples, provides for communications with other data processing systems or devices. In these examples, communications unit 610 includes one or more network interface cards. Communications unit 610 may provide communications through the use of either or both physical and wireless communications links. Programs, as described herein, may be downloaded to persistent storage 608 through communications unit 610.

I/O interface(s) 612 allows for input and output of data with other devices that may be connected to server 125 and/or computing device 120. For example, I/O interface 612 may provide a connection to external devices 618 such as an image sensor, a keyboard, a keypad, a touch screen, and/or some other suitable input device. External devices 618 can also include portable computer readable storage media such as, for example, thumb drives, portable optical or magnetic disks, and memory cards. Software and data 614 used to practice embodiments of the present invention can be stored on such portable computer readable storage media and can be loaded onto persistent storage 608 via I/O interface(s) 612. I/O interface(s) 612 also connect to display 620.

Display 620 provides a mechanism to display data to a user and may be, for example, a computer monitor.

Software and data 614 described herein is identified based upon the application for which it is implemented in a specific embodiment of the invention. However, it should be appreciated that any particular program nomenclature herein is used merely for convenience, and thus the invention should not be limited to use solely in any specific application identified and/or The present invention may be a computer system, a computer-implemented method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method, comprising:
    establishing, by one or more processors, a main channel for communication in a web conference comprising a plurality of users attending the web conference;
    transmitting, by one or more processors, main channel audio data to computing devices associated with the plurality of users;
    receiving, by one or more processors, a first sub-channel request comprising an invitation from a first user to a second user of the plurality of users;

establishing, by one or more processors, a first sub-channel for the communication in the web conference comprising the first user and at least the second user;

generating, by one or more processors, first sub-channel audio data comprising reduced main channel audio data and first sub-channel input audio data comprising first user input audio data and second user input audio data;

determining, by one or more processors, that the first sub-channel includes a sub-channel mode that is set to a public mode;

identifying, by one or more processors, additional sub-channels comprising additional sub-channel audio data having respective sub-channel modes set to the public mode;

applying, by one or more processors, a first reduced audio factor to the additional sub-channel audio data to generate reduced sub-channel public audio data;

transmitting, by one or more processors, the first sub-channel audio data to the first sub-channel; and transmitting, by one or more processors, reduced sub-channel public audio data to the additional sub-channels.

2. The computer-implemented method of claim 1, wherein the invitation from the first user to at least the second user invites one or more of the plurality of users except a currently presenting user corresponding to a host of the web conference.

3. The computer-implemented method of claim 1, wherein generating the first sub-channel audio data further comprises:

applying, by one or more processors, a second reduced audio factor to the main channel audio data to generate the reduced main channel audio data having a sub-channel decibel level that is less than a main channel decibel level.

4. The computer-implemented method of claim 1, wherein transmitting the first sub-channel audio data to the first sub-channel further comprises:

transmitting, by one or more processors, the reduced main channel audio data and the first user input audio data to at least a second computing device associated with the second user; and transmitting, by one or more processors, the reduced main channel audio data and the second user input audio data to at least a first computing device associated with the first user.

5. The computer-implemented method of claim 1, further comprising:

determining, by one or more processors, that the first sub-channel includes a sub-channel mode that is set to a private mode; and restricting, by one or more processors, access to the first sub-channel set to the private mode to only the plurality of users receiving a second invitation from one or more of the first user and at least the second user communicating in the first sub-channel set to the private mode.

6. The computer-implemented method of claim 1, further comprising:

receiving, by one or more processors, an audio factor change request corresponding to a decibel level change to one or more of the main channel audio data and the first sub-channel audio data; and processing, by one or more processors, the audio factor change request to change a composition ratio between one or more of the main channel audio data and the first sub-channel audio data.

7. A computer program product, the computer program product comprising:

one or more computer readable storage media and program instructions collectively stored on the one or more computer readable storage media, the program instructions comprising:

program instructions to establish a main channel for communication in a web conference comprising a plurality of users attending the web conference;

program instructions to transmit main channel audio data to computing devices associated with the plurality of users;

program instructions to receive a first sub-channel request comprising an invitation from a first user to at least a second user of the plurality of users;

program instructions to establish a first sub-channel for the communication in the web conference comprising the first user and at least the second user;

program instructions to generate first sub-channel audio data comprising reduced main channel audio data and first sub-channel input audio data comprising first user input audio data and second user input audio data;

program instructions to determine that the first sub-channel includes a sub-channel mode that is set to a public mode;

program instructions to identify additional sub-channels comprising additional sub-channel audio data having respective sub-channel modes set to the public mode;

program instructions to apply a first reduced audio factor to the additional sub-channel audio data to generate reduced sub-channel public audio data;

program instructions to transmit the first sub-channel audio data to the first sub-channel; and program instructions to transmit reduced sub-channel public audio data to the additional sub-channels.

8. The computer program product of claim 7, wherein the invitation from the first user to at least the second user invites one or more of the plurality of users except a currently presenting user corresponding to a host of the web conference.

9. The computer program product of claim 7, wherein the program instructions to generate the first sub-channel audio data further comprises:

program instructions to apply a second reduced audio factor to the main channel audio data to generate the reduced main channel audio data having a sub-channel decibel level that is less than a main channel decibel level.

10. The computer program product of claim 7, wherein the program instructions to transmit the first sub-channel audio data to the first sub-channel further comprises:

program instructions to transmit the reduced main channel audio data and the first user input audio data to at least a second computing device associated with the second user; and program instructions to transmit the reduced main channel audio data and the second user input audio data to at least a first computing device associated with a first computing device associated with the first user.

11. The computer program product of claim 7, further comprising:

program instructions to determine that the first sub-channel includes a sub-channel mode that is set to a private mode; and program instructions to restrict access to the first sub-channel to only the plurality of users receiving a second invitation from one or more of the first user and at least the second user communicating in the first sub-channel.

12. The computer program product of claim 7, further comprising:
program instructions to receive an audio factor change request corresponding to a decibel level change to one or more of the main channel audio data and the first sub-channel audio data; and
program instructions to process the audio factor change request to change a composition ratio between one or more of the main channel audio data and the first sub-channel audio data.

13. A computer system, the computer system comprising:
one or more computer processors;
one or more computer readable storage media;
program instructions stored on the one or more computer readable storage media for execution by at least one of the one or more processors, the program instructions comprising:
program instructions to establish a main channel for communication in a web conference comprising a plurality of users attending the web conference;
program instructions to transmit main channel audio data to computing devices associated with the plurality of users;
program instructions to receive a first sub-channel request comprising an invitation from a first user to at least a second user of the plurality of users;
program instructions to establish a first sub-channel for the communication in the web conference comprising the first user and at least the second user;
program instructions to generate first sub-channel audio data comprising reduced main channel audio data and first sub-channel input audio data comprising first user input audio data and second user input audio data;
program instructions to determine that the first sub-channel includes a sub-channel mode that is set to a public mode;
program instructions to identify additional sub-channels comprising additional sub-channel audio data having respective sub-channel modes set to the public mode;
program instructions to apply a first reduced audio factor to the additional sub-channel audio data to generate reduced sub-channel public audio data;
program instructions to transmit the first sub-channel audio data to the first sub-channel;
and program instructions to transmit reduced sub-channel public audio data to the additional sub-channels.

14. The computer system of claim 13, further comprising:
program instructions to receive an audio factor change request corresponding to a decibel level change to one or more of the main channel audio data and the first sub-channel audio data; and
program instructions to process the audio factor change request to change a composition ratio between one or more of the main channel audio data and the first sub-channel audio data, wherein the invitation from the first user to at least the second user invites one or more of the plurality of users except a currently presenting user corresponding to a host of the web conference.

15. The computer system of claim 13, wherein the program instructions to generate the first sub-channel audio data further comprises:
program instructions to apply a second reduced audio factor to the main channel audio data to generate the reduced main channel audio data having a sub-channel decibel level that is less than a main channel decibel level.

16. The computer system of claim 13, wherein the program instructions to transmit the first sub-channel audio data to the first sub-channel further comprises:
program instructions to transmit the reduced main channel audio data and the first user input audio data to at least a second computing device associated with the second user; and
program instructions to transmit the reduced main channel audio data and the second user input audio data to at least a first computing device associated with a first computing device associated with the first user.

17. The computer system of claim 13, further comprising:
program instructions to determine that the first sub-channel includes a sub-channel mode that is set to a private mode;
program instructions to restrict access to the first sub-channel to only the plurality of users receiving a second invitation from one or more of the first user and at least the second user communicating in the first sub-channel.

* * * * *